US00RE42396E

(19) United States
(12) Reissued Patent
Hills

(10) Patent Number: US RE42,396 E
(45) Date of Reissued Patent: May 24, 2011

(54) METHOD OF DETERMINISTIC GARBAGE COLLECTION

(75) Inventor: Theodore S. Hills, Lambertvile, NJ (US)

(73) Assignee: Tangie Data Holdings LLC, Las Vegas, NV (US)

(21) Appl. No.: 11/286,439

(22) Filed: Nov. 23, 2005

Related U.S. Patent Documents

Reissue of:
(64) Patent No.: 6,654,773
Issued: Nov. 25, 2003
Appl. No.: 09/794,846
Filed: Feb. 27, 2001

(51) Int. Cl.
*G06F 17/30* (2006.01)

(52) U.S. Cl. ..... 707/813; 711/170; 711/E12.009; 707/817

(58) Field of Classification Search ..... 707/206, 707/813, 817, 999.206; 711/170, E12.01, 711/E12.009, E12.011, E12.012
See application file for complete search history.

(56) References Cited

U.S. PATENT DOCUMENTS

| | | | | | |
|---|---|---|---|---|---|
| 4,755,939 | A | | 7/1988 | Watson | |
| 4,775,932 | A | * | 10/1988 | Oxley et al. | 707/206 |
| 5,398,334 | A | | 3/1995 | Topka et al. | |
| 5,652,883 | A | | 7/1997 | Adcock | |
| 5,799,185 | A | * | 8/1998 | Watanabe | 707/206 |
| 5,848,423 | A | | 12/1998 | Ebrahim et al. | |
| 5,900,001 | A | | 5/1999 | Wolczko et al. | |
| 5,903,899 | A | | 5/1999 | Steele, Jr. | |
| 5,960,087 | A | * | 9/1999 | Tribble et al. | 713/167 |
| 6,094,664 | A | * | 7/2000 | Ungar | 707/206 |
| 6,144,965 | A | * | 11/2000 | Oliver | 707/100 |
| 6,421,690 | B1 | * | 7/2002 | Kirk, III | 707/206 |
| 6,473,773 | B1 | * | 10/2002 | Cheng et al. | 707/200 |
| 6,487,563 | B1 | * | 11/2002 | Houldsworth | 707/206 |
| 6,799,191 | B2 | * | 9/2004 | Agesen et al. | 707/206 |
| 7,469,324 | B2 | * | 12/2008 | Tene et al. | 711/159 |
| 7,584,232 | B2 | * | 9/2009 | Guo | 707/206 |
| 2001/0037412 | A1 | | 11/2001 | Miloushev et al. | |
| 2006/0155791 | A1 | * | 7/2006 | Tene et al. | 707/206 |
| 2007/0203960 | A1 | * | 8/2007 | Guo | 707/206 |

OTHER PUBLICATIONS

"D Programming Language"—Digital Mars, 1999–2002.
Horstmann, Cay S. "Memory management and smart pointers." In C++ Report, 5,3 (Mar./Apr. 1993), 28–34. New York: 101 Communications, 1993.

* cited by examiner

*Primary Examiner*—Leslie Wong
(74) *Attorney, Agent, or Firm*—Schwabe, Williamson & Wyatt, P.C.

(57) ABSTRACT

A garbage collection method that distinguishes between local objects and managed objects, and between an ordinary pointer to an object, an owning pointer to an object, and a non-owning pointer to an object is presented. Ordinary pointers point only to local objects, and owning and non-owning pointers point only to managed objects. Managed objects have attributes including a count of the number of owning pointers referring to them, and a linked list of non-owning pointers referring to them. Managed objects only possess non-owning pointers. Only an invocation of a subroutine within a thread can possess an owning pointer. Using this method, when an invocation exits, its exit code gives up ownership of all objects it owned. When an object is no longer reachable from any owning pointer, either directly, or indirectly through non-owning pointers, the object is immediately de-allocated. By implementing data structures and methods to support owning pointers, non-owning pointers, and managed objects, and by enforcing rules regarding the use of ordinary pointers, owning pointers, and non-owning pointers, efficient and deterministic garbage collection is achieved, memory leaks and dangling pointers are eliminated, and objects containing circular references to each other are not a source of memory leaks.

40 Claims, 4 Drawing Sheets

METHOD OF DETERMINISTIC GARBAGE COLLECTION

Matter enclosed in heavy brackets [ ] appears in the original patent but forms no part of this reissue specification; matter printed in italics indicates the additions made by reissue.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to programming of digital computers, and, more specifically, to memory management and garbage collection.

There are presently two broad approaches to memory management: (1) programmer memory management where programmers are responsible for writing explicit program code to de-allocate memory for the storage of objects no longer needed by a program; and (2) automatic memory management where the de-allocation of memory is done automatically, after the system determines that objects are no longer needed.

If memory management is automatic, there is no room left for programmer errors in memory management, which result in memory leaks, dangling pointers, or both.

A memory leak occurs when a program fails to de-allocate an object which it no longer needs. The accumulation of such unneeded objects during the execution of a program can lead to an unnecessary exhaustion of memory available for executing the program, end a resultant program abortion.

A dangling pointer reflects the converse mistake in memory management. This occurs when program code is executed which de-allocates an object while pointers to it still exist in an executing program. If some portion of code attempts to use the de-allocated object through a pointer it still possesses, the result is unpredictable and usually erroneous.

Automatic memory management removes the possibility of either of these errors. There is therefore an increase in the expectation of the reliability of a program executed with automatic memory management, over one executed with programmer-controlled explicit memory management. There is a significant labor savings in developing software for a system that supplies automatic memory management, since memory management mistakes are difficult to discover. However, automatic memory management systems do exact a toll in the efficiency of the programs using them, as is discussed below.

Many garbage collection methods have been proposed, the purpose of all of which is to discover, automatically and in as little processing time as possible, what objects in a program's memory are no longer needed by a program, so that those objects can be de-allocated and their storage reclaimed. Some of these garbage collection methods have significant processing overhead, which reduces the desirability of these methods and even precludes them from being used in certain applications (such as high-speed real-time systems). Thus, it is desirable that automatic memory management be as efficient as possible, to allow the broadest range of applicability.

Many garbage collection systems are constructed so as to suspend the normal execution of a program at random intervals, in order to find and delete objects in memory that are no longer needed. A program executed with such a garbage collection system can never be depended on to run in exactly the same manner as any prior execution, even given all of the same operating conditions and inputs. Determinism is lost.

Determinism is important for real-time applications where physical processes outside a computer controlling them are occurring at a fixed rate. The software controlling such computers must be able to guarantee that it will respond to external events within known time limits. Under such circumstances, the use of a non-deterministic garbage collection mechanism may be precluded.

One approach to garbage collection uses reference counting. In this method, each object has a property attached to it called its reference count, which is merely the number of objects that possess a pointer to that object. Clearly, when an object's reference count becomes zero, it may safely be de-allocated.

It is fairly simple and somewhat efficient to manage a reference count for an object, but the method has a significant limitation involving circular references. Suppose a program allocates objects A and B, stores a reference to A in B, and stores a reference to B in A. Now, even if all other references to the objects A and B are deallocated, A and B would each have a reference count of 1, indicating their references to each other. Thus, A and B would never be de-allocated, and this represents a memory leak.

BRIEF SUMMARY OF THE INVENTION

The above-discussed and other drawbacks and deficiencies of the prior art are overcome or alleviated by a garbage collection method of the present invention. The garbage collection method distinguishes between local objects and managed objects, and between an ordinary pointer to an object, an owning pointer to an object, and a non-owning pointer to an object. Ordinary pointers may point only to local objects, and owning and non-owning pointers may point only to managed objects. Managed objects have attributes including a count of the number of owning pointers referring to them, and a linked list of non-owning pointers referring to them. Managed objects may only possess non-owning pointers. Only an invocation of a subroutine within a thread can possess an owning pointer. Using this method, when an invocation exits, its exit code gives up ownership of all objects it owned. When an object is no longer reachable from any owning pointer, either directly, or indirectly through non-owning pointers, the object is immediately deallocated.

By implementing data structures and methods to support owning pointers, non-owning pointers, and managed objects, and by enforcing rules regarding the use of ordinary pointers, owning pointers, and non-owning pointers, efficient and deterministic garbage collection is achieved, memory leaks and dangling pointers are eliminated, and objects containing circular references to each other are not a source of memory leaks.

The present invention is embodied in software preferably written using an object-oriented programming language. It is also embodied in multi-threaded environments, multi-process environments, and as part of a persistence management system. It is embodied as an intrinsic part of a programming language. It may also be used to access POSIX®-compliant file systems.

The garbage collection method of the present invention has the following and other advantages over prior art garbage collection methods, some of which are essential for real-time applications. It is deterministic. A given graph of managed objects, owning pointers, and non-owning pointers will always be destroyed at the same point in a program, on every run of that program under the same conditions. Given these characteristics, a program never will be pre-empted randomly while a garbage collector cleans up memory. The cost of memory management, and the timing of its execution, can always be directly derived from the program. It de-allocates as early as possible, so total memory consumption is always the minimum possible. Destruction is guaranteed before termination of the program. In an object-oriented implementation, destruction will call an object's destructor to release any resources in use by the object, which may include resources other than memory. An object-oriented programming system incorporating the present invention can guarantee that the destructor of every object will be called as soon as the abject is no longer reachable by the program.

The above-discussed and other features and advantages of the present invention will be appreciated and understood by those skilled in the art from the following detailed description and drawings.

BRIEF DESCRIPTION OF THE SEVERAL VIEWS OF THE DRAWING

Referring now to the drawing wherein like elements are numbered alike in the several FIGURES.

DETAILED DESCRIPTION OF THE INVENTION

Figure 1:
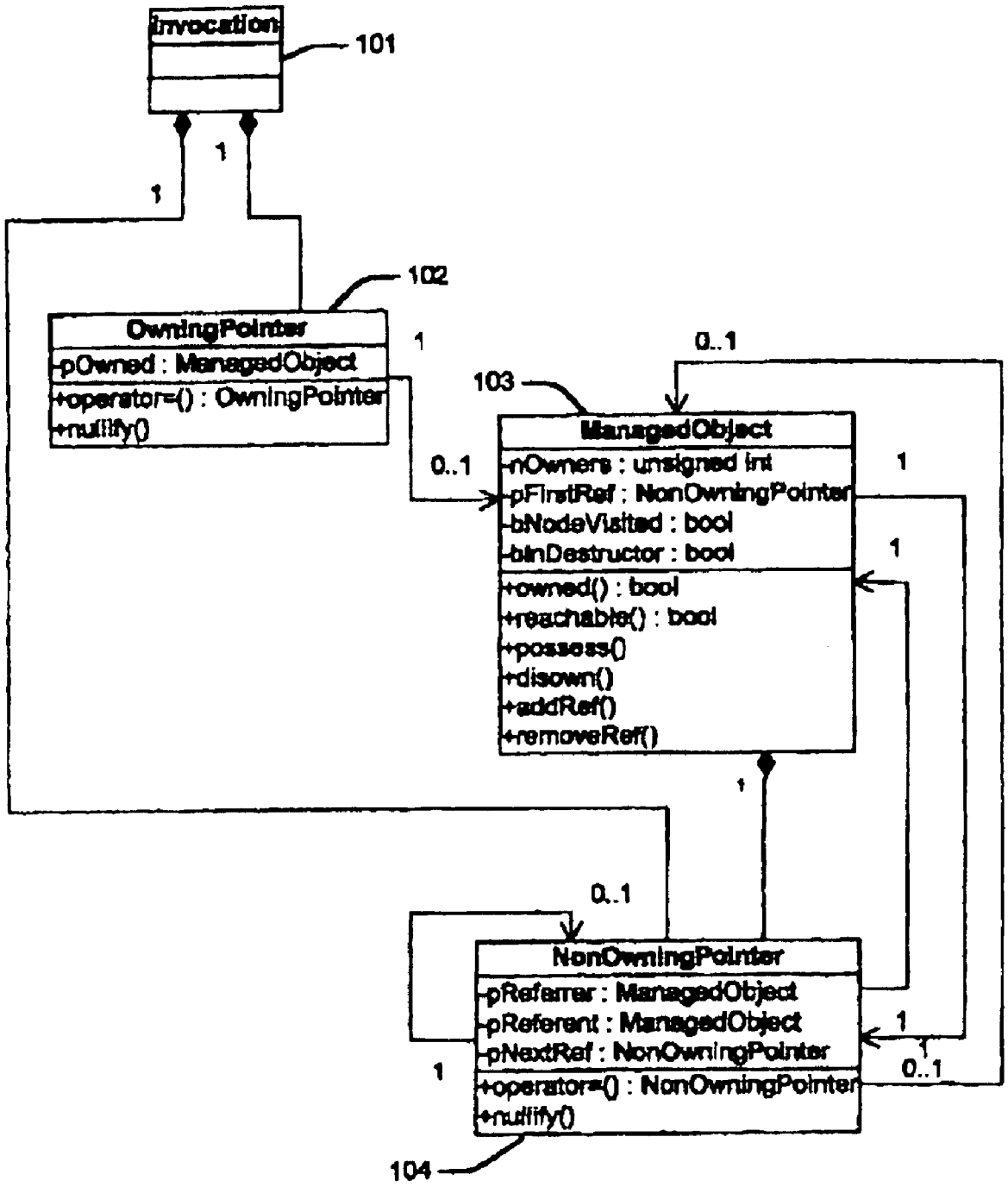
FIG. 1 is a Unified Modeling Language (UML) static class diagram depicting the static relationships between the classes Invocation, OwningPointer, ManagedObject, and NonOwningPointer, in accordance with the present invention.

The present invention specifies an invocation, an owning pointer, a non-owning pointer, and a managed object. In the preferred embodiment, these are modeled using statements of an object-oriented programming language as classes with the names Invocation, OwningPointer, NonOwningPointer, and ManagedObject, respectively. FIG. 1 shows these classes using the graphical symbols of the Unified Modeling Language (UML), as defined by Rumbaugh, James, Ivar Jacobson, and Grady Booch, "The Unified Modeling Language Reference Manual," Reading, Mass., Addison-Wesley, 1999, which is incorporated herein by reference.

An invocation is an invocation of a subroutine within a thread of a process of a system. An invocation ceases to exist when it is exited. An owning pointer is a pointer from an invocation to a managed object that establishes an ownership relationship between the invocation and the managed object. The owner of an owning pointer owns the managed object to which it points. A non-owning pointer is a pointer from an owner to a managed object that does not establish an ownership relationship between the owner and the managed object. The owner of a non-owning pointer does not own the managed object to which it points. Only owning and non-owning pointers may point to managed objects, and owning and non-owning pointers may only point to managed objects. Owning pointers may only exist as local objects in invocations, and must be destroyed when their invocations exit. Owning pointers may not exist as members of managed objects. Non-owning pointers may exist as local objects in invocations, or as members by composition of managed objects. Both owning and non-owning pointers have semantics very similar to ordinary pointers. Both can reference either exactly one object, or no objects at all when in the null state. Both can be altered to reference various objects at various times, and/or be set to the null state. Both can be de-referenced to access the referenced object.

Ownership is a relationship between an object and an owner that governs the lifetime of the object, where the object may not be destroyed except by its sole or final owner, and may not outlive its sole or final owner. An owner is an invocation or a managed object that owns other objects. An invocation owns all of its local objects, and owns all of the managed objects referenced by owning pointers that it owns as local objects. A managed object owns all of its local objects; that is, all of the members of which it is composed. A local object is an object that is not a managed object. It is allocated in such a way that it will not outlive the invocation or managed object that created it. Ordinary pointers may only exist as local objects, and must be destroyed when their owners are destroyed. Only ordinary pointers may point to local objects, and ordinary pointers may only point to local objects. An ordinary pointer is neither an owning pointer nor a non-owning pointer.

A managed object is an object that has been allocated in such a way that the garbage collection method described herein can be applied to it. It is of interest to allocate an object as a managed object if it could potentially outlive the invocation that created it, and/or if references to it could outlive the invocation that created it. Managed objects must be allocated in such a way that they may live longer than the invocation which allocates them, but local objects may be allocated in such a way that they cannot live longer than the invocation which allocates them. For instance, in the preferred embodiment, invocations use a stack data structure for local objects, such that local objects are popped from the stack upon exit of an invocation. Managed objects may not be allocated on such a stack, but local objects may be allocated on such a stack. Alternatively, local objects may be allocated on a heap or other data structure also containing managed objects, but this does not cause local objects so allocated to become managed objects. As soon as an owner creates a managed object, an owning or non-owning pointer must reference it. Once a managed object exists, more owning and non-owning pointers may point to it. A managed object is reachable if there is at least one owning or non-owning pointer owned by and local to an invocation which can reach the object through that pointer, either directly through that pointer, or indirectly through non-owning pointers in other managed objects accessible through that pointer. The design of the garbage collection method described herein is such that a managed object will exist as long as it is reachable, and will be destroyed as soon as it is no longer reachable. When a managed object is destroyed, all non-owning pointers to it, if any, are nullified. To nullify a pointer is to set it to the null state, such that it references no objects. A pointer that is in the null state can be referred to as a null pointer. The destruction of a managed object may in turn cause other managed objects to become unreachable. This condition consequently requires that those managed objects be destroyed as well.

To destroy an object means to both finalize and de-allocate an object. Destruction is the process of destroying an object. To finalize an object means to set all of its members to a final state, in which de-allocation of the object can be done correctly, with no leaks of memory or other resources. The terms destroy and destruction are commonly used in object-oriented systems. In the present invention, certain methods must be executed immediately before the de-allocation of managed objects. In a preferred embodiment of the invention an object-oriented programming language system is employed, wherein the methods that must be executed immediately before the destruction of objects is implemented in the destructor methods of managed objects.

Referring now to FIG. 1, a class Invocation 101 is abstract, and represents an invocation, to which instances of a class OwningPointer 102 and a class NonOwningPointer 104 may be local. Although not represented in FIG. 1, Invocation 101 has a destructor, which on exit of an invocation destroys all of the objects which it owns. In an object-oriented programming language system, this is the normal destruction of local objects that occurs when an invocation exits. This includes the destruction of OwningPointers 102, NonOwningPointers 104, and ordinary pointers that are local to the invocation that is exiting. The destruction of Owning Pointers 102 and NonOwningPointers 104 is discussed below.

OwningPointer 102 represents an owning pointer. OwningPointer 102 has only one attribute and that is an ordinary pointer pOwned to a Managed Object 103. A method operator=( ) of OwningPointer 102 (i.e., the assignment operator) allows the value of another instance of OwningPointer 102 to be copied to the current instance of OwningPointer 102. An overloaded operator=( ) may also be defined as a member of OwningPointer 102 that allows the current instance to be set to refer to the referent of an instance of NonOwningPointer 104. The method nullify( ) of OwningPointer 102 causes the current instance of OwningPointer 102 to enter the null state, such that it ceases to reference any ManagedObject 103. Its algorithm is given in more detail below. Although not represented in FIG. 1, OwningPointer 102 has a destructor.

In FIG. 1, class ManagedObject 103 represents a managed object. ManagedObject 103 has a count of its direct owners nOwners, which is the count of instances of OwningPointer 102 that refer to it. ManagedObject 103 has an ordinary pointer pFirstRef that is the head of a singly linked list to instances of class NonOwningPointer 104 that refer to ManagedObject 103. This singly linked list is important in the garbage collection method, as will be described below. ManagedObject 103 has a Boolean flag bNodeVisited, used to prevent endless loops when traversing the singly linked list. ManagedObject 103 has a Boolean flag bInDestructor, used to prevent infinite recursion when destroying ManagedObject 103.

A function owned( ) of ManagedObject 103 returns true if and only if member nOwners of the current instance of ManagedObject 103 is not zero. A function reachable( ) of ManagedObject 103 returns true if either owned( ) returns true, or if the member pfirstRef of the current instance of ManagedObject 103 is not null, and at least one of NonOwningPointers 104 on the list headed by the pFirstRef has a pReferrer referencing an instance of ManagedObject 103 whose reachable( ) function returns true. The algorithm of the function reachable( ) is presented in greater detail below.

A method possess( ) is called on an instance of ManagedObject 103 by OwningPointer 102 when its value is set to refer to that instance. The method does nothing more than increases nOwners by 1. A method disown( ) is called on an instance of ManagedObject 103 by OwningPointer 102 when its value was set to refer to that instance, but is changed so that it no longer points to that instance. The method does nothing more than decreases nOwners by 1.

A method addRef( ) is called on an instance of ManagedObject 103 by NonOwningPointer 104 when its value is set to refer to that instance. The method links the instance of NonOwningPointer 104 that called it into the singly linked list headed by its attribute pfirstRef A method removeRef( ) is called on an instance of ManagedObject 103 by NonOwningPointer 104 when its value was set to refer to that instance, but is changed so that it no longer points to that instance. The method unlinks the instance of NonOwningPointer 104 that called it from the singly linked list headed by its attribute pFirstRef Although not represented in FIG. 1, ManagedObject 103 has a destructor.

In FIG. 1, class NonOwningPointer 104 represents a non-owning pointer. An ordinary pointer pReferrer that is a member of NonOwningPointer 104 points to the instance of class ManagedObject 103 containing NonOwningPointer 104 by composition. It is needed in order to interrogate the instance of ManagedObject 103 to find whether it is reachable. An ordinary pointer pReferent that is a member of NonOwningPointer 104 points to the instance of class ManagedObject 103 to which NonOwningPointer 104 refers. The ordinary pointer pReferent is the one used when NonOwningPointer 104 is de-referenced. An ordinary pointer pNextRef is part of the singly linked list of ordinary pointers to the instance of ManagedObject 103 indicated by pReferent. All of the NonOwningPointers 104 on the list point to the same instance of ManagedObject 103; that is, they all have the same value for pReferent.

These attributes enable a reachable( ) function to work. They also allow instances of NonOwningPointers 104 to be nullified when their referent (indicated by pReferent) is destroyed. A method operators=( ) of NonOwningPointer 104 (i.e., the assignment operator) allows the value of another instance of NonOwningPointer 104 to be copied to the current instance of NonOwningPointer 104. An overloaded operator ( )=may also be defined as a member of NonOwningPointer 104 that allows the current instance to be set to refer to the referent of an instance of OwningPointer 102. A method nullify( ) of NonOwningPointer 104 causes the current instance of NonOwningPointer 104 to enter the null state, such that it ceases to reference any ManagedObject 103. Its algorithm is given in more detail below. Although not represented in FIG. 1, NonOwningPointer 104 has a destructor.

A singly linked list of NonOwningPointers 104, together with ManagedObjects 103 that possess these pointers by composition, form a directed graph that may contain cycles. This is the problem of circular references encountered in the prior art. In order to traverse this graph to determine whether any ManagedObject 103 is reachable from Invocation 101, each node visited must be marked, so that in following a cycle in the graph, an endless loop does not occur. To that end, a bNodeVisited Boolean attribute of ManagedObject 103 is set to true before interrogating its list of NonOwningPointers 104, and set to false upon completion. If, during a traversal of the graph, ManagedObject 104 is found with bNodeVisited true, it is treated as a non-reachable node. This will be seen in the algorithm presented below.

Figure 2:
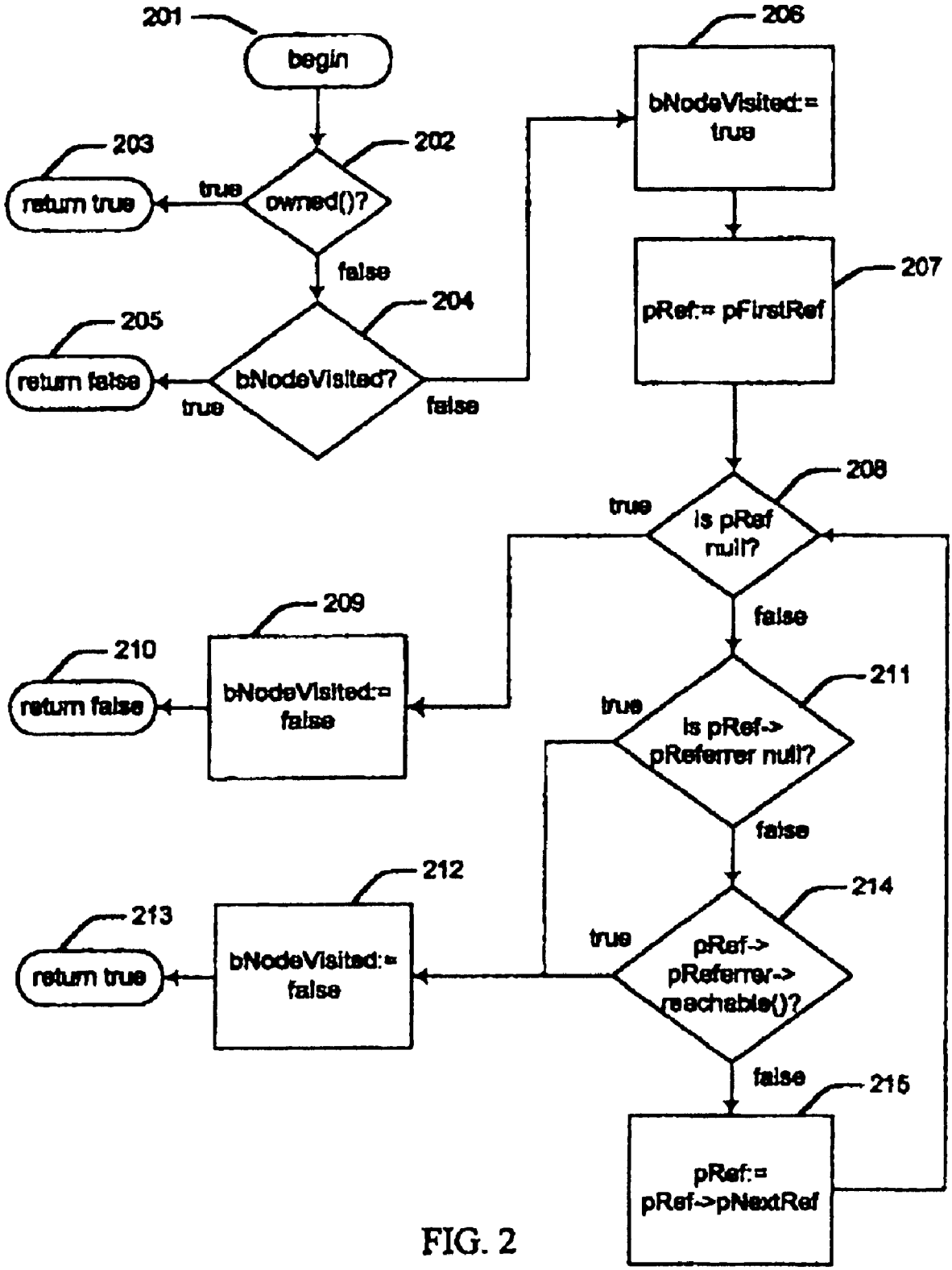
FIG. 2 is a flowchart of the reachable( ) function of the ManagedObject class.

Referring to FIG. 2, a flowchart of a reachable( ) function of ManagedObject 103 class is generally shown. Execution begins at a terminator symbol 201. The reachable( ) function tests 202 the owned( ) function of the current instance of class Managed Object 103. If the owned( ) function returns true, meaning the nOwners member of the current instance is non-zero, the reachable( ) function returns true 203, indicating to the caller that the current instance of class ManagedObject 103 is reachable. In this case, the instance is reachable because it has one or more owners. If the owned( ) function returns false, meaning the nOwners member of the current instance is zero, the reachable( ) function tests 204 the bNodeVisited member of the current instance. If this is true, then the reachable( ) function has been recursively invoked by an earlier invocation of the reachable( ) function on the same instance of class ManagedObject 103. This can happen when there are cycles in the graph of references between instances of class ManagedObject 103. In order to avoid infinite recursive calls to the reachable( ) function, the reachable( ) function immediately returns false 205.

If the bNodeVisited member of the current instance is false, then the reachable( ) function sets it to true 206, to prevent infinite recursive calls of the reachable( ) function as just described. The reachable( ) function then sets a new local variable, an ordinary pointer pRef, to the value of the member pFirstRef of the current instance 207. From this point on, a variable pRef indicates the current node on the singly linked list whose head is pointed to by pFirstRef. If the list is empty, pRef will be null.

The reachable( ) function next tests pRef 208. If it is null, then the list is empty. The reachable( ) function sets member bNodeVisited to false 209, and returns false to a caller 210, indicating that the current instance of class ManagedObject 103 is not reachable. In this case, the instance is not reachable because it has no owners, and no other NonOwningPointers 104 refer to it.

If pRef is not null, the reachable( ) function tests pRef->pReferrer 211. If pRef->pReferrer is null, then the referrer, that is, the owner of the instance of NonOwningPointer 104 indicated by pRef, is an invocation. Since this NonOwningPointer 104 is owned by an invocation, ManagedObject 103 to which it refers by pReferent is reachable by that invocation. The reachable( ) function sets bNodeVisited to false 212, and returns true 213.

If pRef->pReferrer is not null, then the referrer is ManagedObject 103 indicated by pRef->pReferrer; that is, ManagedObject 103 that owns by composition NonOwningPointer 104 indicated by pRef. The reachable function invokes pRef>p-Referrer->reachable( ) 214. If the reachable( ) function so invoked returns true, then the reachable( ) function of the current instance sets bNodeVisited to false 212, and returns true to the caller 213, indicating that the current instance of class ManagedObject 103 is reachable. In this case, the instance is reachable, even though it has no owners, because ManagedObject 103 has been found which refers to it and which is itself reachable.

If the reachable( ) function returns false, then the reachable( ) function of the current instance sets local variable pRef to the value of pNextRef in the current node pointed to by pRef 215. After this assignment, either pRef points to the next node on the linked list, or, if the previous value of pRef pointed to the last node on the list, pRef is null. The reachable( ) function of the current instance then loops to test pRef again 208. If it is null, then the end of the list has been reached. The reachable( ) function sets member bNodeVisited to false 209, and returns false to the caller 210, indicating that the current instance of class ManagedObject 103 is not reachable. In this case, the instance is not reachable because it has no owners, and other NonOwningPointers 104 refer to it, but none of them are reachable.

If pRef is not null, the reachable( ) function of the current instance continues with the test indicated by box 211 on the flowchart, as described above. This loop terminates when either a reachable node is found or the end of the singly linked list is reached, as described above.

Figure 3:
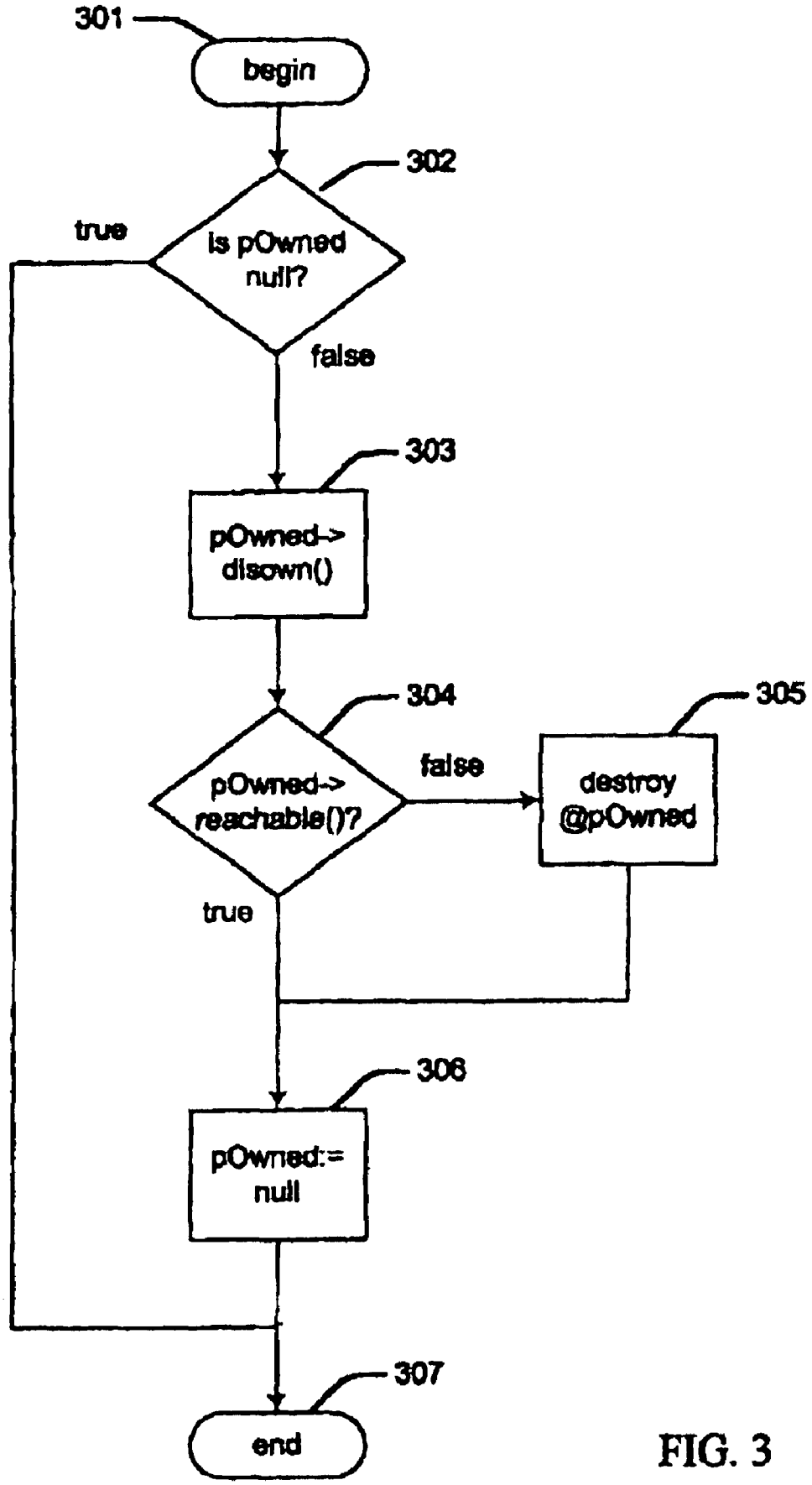
FIG. 3 is a flowchart of the nullify( ) method of the OwningPointer class.

The nullify( ) method can be invoked on any instance of OwningPointer 102, and will cause the destruction of ManagedObject 103 to which it refers if that ManagedObject 103 becomes unreachable. Referring to FIG. 3, a flowchart of the nullify( ) method of class OwningPointer 102 is generally shown. Execution begins at the terminator 301. The method tests the attribute pOwned 302. If it is null, then there is nothing for the nullify( ) method to do, and so it exits 307.

If the pOwned attribute is not null, then it refers to some instance of ManagedObject 103. The nullify( ) method invokes the disown( ) method 303 of that ManagedObject 103. It then interrogates the same instance of ManagedObject 103 indicated by pOwned, to determine whether it is still reachable 304. If ManagedObject 103 is no longer reachable, the nullify( ) method destroys it 305. Whether reachable or not, the nullify( ) method sets pOwned to null 306, and exits 307.

The nullify( ) method is invoked by other methods of OwningPointer 102 under the following conditions: upon destruction of an OwningPointer 102; and if an assignment method is called, and the ManagedObject 103 to which the OwningPointer 102 currently refers is not the same as the one to which it will refer after the assignment method completes. By this means, whenever an OwningPointer 102 ceases to point to a ManagedObject 103, that ManagedObject 103 is tested to see if it is still reachable and if it is not, that ManagedObject 103 is destroyed.

Figure 4:
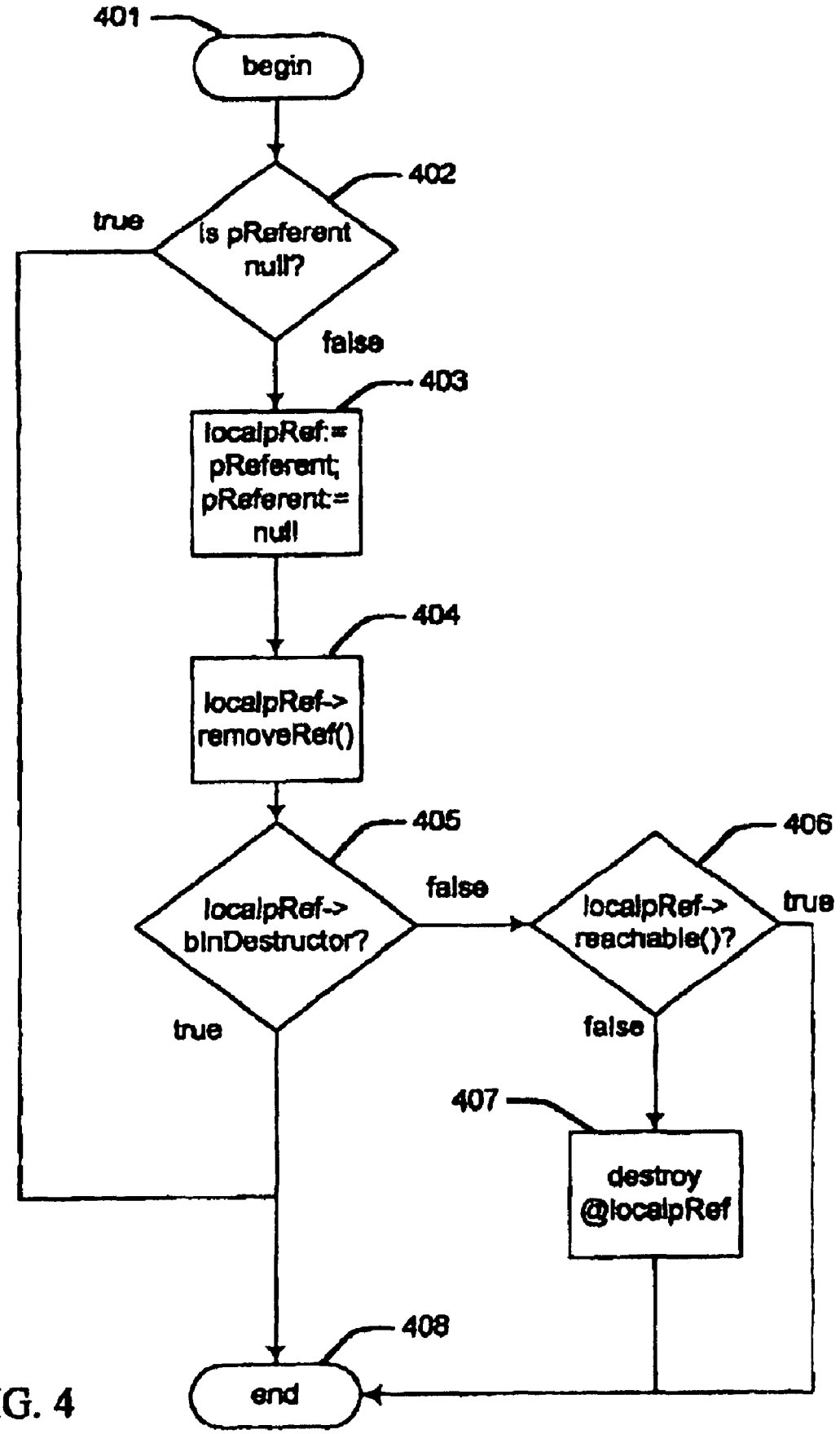
FIG. 4 is a flowchart of the nullify( ) method of the NonOwningPointer class.

The nullify( ) method can be invoked on any instance of NonOwningPointer 104, and will cause the destruction of the ManagedObject 103 to which it refers if that ManagedObject 103 becomes unreachable. Referring to FIG. 4, a flowchart of the nullify( ) method of class NonOwningPointer 104 is generally shown. Execution begins at the terminator 401. The method tests the attribute pReferent 402. If it is null, then there is nothing for the nullify( ) method to do, and so it exits 408.

If the pReferent attribute is not null, then it refers to some instance of ManagedObject 103. The nullify( ) method sets a new local variable, localpRef, to the value of pReferent, and sets pReferent to null 403. This prevents infinite recursive calls to nullify( ) on the same instance of NonOwningPointer 104.

The nullify( ) method then calls the removeRef( ) method 404 of ManagedObject 103 indicated by localpRef, to remove the current instance of NonOwningPointer 104 from that ManagedObject's singly linked list of referrers. It then interrogates the same instance of ManagedObject 103 indicated by localpRef, to determine whether it is in its destructor, by testing its attribute bInDestructor 405. If true, the nullify( ) method exits 408. If Managed Object 103 is in its destructor, there is no need to destroy it.

If ManagedObject 103 is not in its destructor, the nullify( ) method tests to see if it is still reachable 406. If the ManagedObject 103 is no longer reachable, the nullify( ) method destroys it 407. In either case, the nullify( ) method exits 408.

The nullify( ) method is invoked by other methods of NonOwningPointer 104 under the following conditions: upon destruction of a NonOwningPointer 104; and if an assignment method is called, and the ManagedObject 103 to which the NonOwningPointer 104 currently refers is not the same as the one to which it will refer after the assignment method completes. By this means, whenever a NonOwning- Pointer 104 ceases to point to a ManagedObject 103, that ManagedObject 103 is tested to see if it is still reachable and if it is not, that ManagedObject 103 is destroyed.

By virtue of an object-oriented programming system, a NonOwningPointer 104 that is a member by composition of ManagedObject 103 is only destroyed when ManagedObject 103 of which it is a member is about to be destroyed. By calling nullify( ), the destruction of NonOwningPointer 104 may cause other ManagedObjects 103 to become unreachable, and therefore cause their destruction. In order to prevent erroneous recursive destruction of ManagedObject 103 containing the current NonOwningPointer 104 by composition, the destructor of the NonOwningPointer 104 sets that ManagedObject's bInDestructor attribute to true before it calls the nullify( ) method, and sets it to false upon return.

When an instance of class ManagedObject 103 is destroyed, its destructor is invoked. The destructor sets Boolean attribute bInDestructor to true, then walks the list of NonOwningPointers 104 whose head is pointed to by the attribute pFirstRef, and invokes the nullify( ) method on each pointer encountered. As a result, the destruction of an object of class ManagedObject 103 causes all NonOwningPointers 104 which reference it to be nullified. Upon completion, the destructor sets Boolean attribute bInDestructor to false.

The nullification of a NonOwningPointer 104 can result in ManagedObject 103 becoming unreachable, and if this occurs, ManagedObject 103 is destroyed by the nullify( ) method of NonOwningPointer 104, as described above. The Boolean attribute bInDestructor prevents the erroneous recursive destruction of ManagedObject 103. The destruction of ManagedObject 103 may result in the destruction of NonOwningPointers 104 it may contain to other objects, which may result in the further destruction of ManagedObjects 103 if they become non-reachable.

It is preferred to prohibit ordinary pointers from referencing managed objects, because the mechanisms described above cannot be implemented on them. The present invention preserves the invariant in the system that every managed object is reachable or there are no managed objects. Upon creation, every managed object is reachable by the invocation that created it. When an invocation exits, its owning and non-owning pointers are destroyed. As explained above, the destruction of such a pointer causes the system to determine whether the managed object to which it pointed is still reachable. If it is not, the system destroys the managed object, and any other managed objects that were reachable solely through it. Thus, all managed objects existing at any time in the system are guaranteed to be reachable. It can be seen from the above that, if all non-reachable managed objects are immediately destroyed, no memory leaks occur.

It is desirable to resolve the prior art problem of dangling pointers, which is where a pointer to a managed object may continue to exist after the object is de-allocated. It will be noted that an owner can explicitly destroy a managed object, if it is the sole direct owner at that time. The garbage collection method described herein solves the problem of dangling pointers, by guaranteeing that, when a managed object is destroyed, all non-owning pointers to it are nullified.

While the preferred embodiment uses a singly linked list of NonOwningPointers, other data structures, such as a doubly linked list or a hash table of pointers, may be used without departing from the spirit and scope of the invention. Also, a mechanism to defer the destruction of an object found to be no longer reachable may be employed; such is within the scope of the invention, as the object is found to be no longer reachable as soon as that condition is true.

Mechanisms embodying methods of the present invention are incorporated into a programming language. Software which organizes free memory as a heap allocates extra bytes at the beginning of each requested allocation block, to save the attributes of a managed object as described above. The three types of pointers described above are intrinsic to the programming language. The programming language enforces the rules described above regarding the use of pointers with regard to managed objects.

The above description implicitly assumes that all of the managed objects, and the invocations which create them, are running in the same single thread of control. The above mechanism is implemented for a free store (usually a heap) shared by multiple threads of control within a single process, as follows. A single synchronizing lock accessible to all threads of the process serializes allocation operations within the shared free store. If an object is to be made accessible by multiple threads, the object is allocated and managed within the shared free store as follows. When a managed shared object is allocated, it is associated with its own synchronizing lock. All operations on a managed shared object, including the operations described above and other user-defined operations if any, whether invoked by owning or non-owning pointers, or invoked by other code, are serialized on that lock.

Objects not shared by multiple threads are allocated in a free store accessible to only one thread. Neither that free store nor managed objects allocated within it has synchronizing locks. As previously stated, this is implicitly assumed in the prior description. Access to these objects is more efficient, since locking and serialization is not necessary.

The above description also implicitly assumes that all of the managed objects, and the invocations which create them, are running in the same process. The above mechanism is implemented for a free store (usually a heap) shared by multiple processes using shared memory, as follows. A single synchronizing lock, accessible to all processes of the system, serializes allocation operations within the shared memory. If an object is to be made accessible by multiple processes, the object is allocated and managed within the shared memory as follows. When a managed shared object is allocated, it is associated with its own synchronizing lock. All operations on a managed shared object, including the operations described above and other user-defined operations if any, whether invoked by owning or non-owning pointers, or invoked by other code, are serialized on that lock.

Objects not shared by multiple processes are allocated in a free store accessible to only one process. The objects may be allocated in a free store accessible by multiple threads or in a free store accessible by a single thread, as described above.

The mechanism as extended for multi-processing is implemented for a system that persists (saves) objects between invocations of a process, as follows. An eternal system is some entity that exists outside any process of the system, for example an object persistence system, that is deemed to have a lifetime longer than that of any managed object allocated within any process of the system. The eternal system incorporates owning pointers and non-owning pointers as described above. It an object is owned by the eternal system, or is reachable by the eternal system, then it persists. As soon as an object is no longer reachable from the eternal system, it is destroyed.

POSIX®-compliant file systems are defined by "IEEE/ANSI Std 1003.1, 1996 Edition: Information Technology—

Portable Operating System Interface (POSIX&)—Part 1: System Application: Program Interface (API) [C Language]", which is incorporated herein by reference. The present invention mat be utilized to access POSIX®-compliant file systems.

In the POSIX® file system, a file persists as long as it is reachable from the root directory, and is destroyed as soon as it is no longer reachable from the root directory and no program has it opened for access. A file is made reachable by storing a <name, inode> pair as an entry in a directory, where the directory is either the root directory or a directory reachable from the root directory, and an inode identifies the file. A directory is itself a special kind of file. A POSIX®-compliant file system allows multiple named directory entries to reference the same node number. According to the POSIX® specification, as soon as the last directory entry referencing a file's inode is removed, the file itself is destroyed, unless the file is currently open by one or more programs, in which case destruction is deferred until the last program closes the file. When a program opens a file, the operating system gives to the program a file handle that represents its access to that file.

Classes derived from the classes described earlier are implemented to wrap corresponding aspects of POSIX®-compliant file systems as follows. Files are represented in programs as instances of a class derived from the class ManagedObject. Methods of the derived class implement file system operations such as reading and writing, but do not support opening, closing, creating, or destroying files. These are supported through a subclass of OwningPointer, as will be seen below.

A class derived from OwningPointer represents file handles. An instance of the derived class that is not null represents a file that is currently opened by the program containing the instance. The creation of a non-null instance includes the opening of a file. The derived class contains methods to create non-null pointers that correspond to the functions specified by POSIX®-compliant file systems for creating new files and opening existing files. The nullification of an instance of the derived class includes the closing of the corresponding file. The copying of an instance of the derived class causes the duplication of the file handle it contains.

Note that no class derived from NonOwningPointer is defined to represent directory entries in programs. This is unlike the mechanisms described earlier. However, this restriction is no way affects the utility of the invention, as such restriction arises from the specification of POSIX®-compliant file systems, and a more versatile mechanism such as is possible in memory-resident objects is of no value in this case.

In like manner, the present invention may also be used to enable access to systems similar to POSIX®-compliant file systems.

As described above, the present invention can be embodied in the form of computer-implemented processes and apparatuses for practicing those processes. The present invention can also be embodied in the form of computer program code containing instructions embodied in tangible media, such as floppy diskettes, CD-ROM's, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium (embodied in the form of a propagated signal propagated over a propagation medium), such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A garbage collection method comprising:

providing ordinary pointers to point only to local objects, said local objects are objects that must expire before invocations that create them;

providing owning and non-owning pointers to point only to managed objects, said managed objects are objects that may outlive invocations that create them;

determining whether said managed objects are reachable from at least one of said owning pointers;

destroying or marking for destruction at least one of said managed objects when said at least one of said managed objects is un-reachable through said at least one of said owning pointers or said at least one of said non-owning pointers; and nullifying said non-owning pointers pointing to said at least one of said managed objects when said at least one of said managed objects is destroyed or marked for destruction.

2. The method of claim 1 wherein said determining whether said managed objects are reachable from said at least one of said owning pointers comprises:

determining whether said managed objects are reachable from said at least one of said owning pointers through said at least one of said owning pointers or at least one of said non-owning pointers.

3. The method of claim 1 further comprising:

defining classes of said owning and non-owning pointers.

4. The method of claim 3 further comprising:

restricting use of said classes according to rules of a programing language.

5. The method of claim 1 wherein any one of said invocations comprises a subroutine invocation.

6. The method of claim 1 further comprising:

sharing said managed objects with multiple threads of control within a single process; and accessing a shared memory allocation pool serialized by a lock accessible by said threads, said managed objects that are shared are allocated to said shared memory allocation pool, said lock controlling access to said managed objects that are shared.

7. The method of claim 6 further comprising:

defining classes of said owning and non-owning pointers; and restricting use of said classes according to rules of a programming language.

8. The method of claim 1 further comprising:

sharing said managed objects with multiple processes within a single system; and accessing a shared memory allocation pool serialized by a lock accessible by said processes, said managed objects that are shared are allocated to said shared memory allocation pool, said lock controlling access to said managed objects that are shared.

9. The method of claim 8 further comprising:

defining classes of said owning and non-owning pointers; and restricting use of said classes according to rules of a programming language.

10. The method of claim 1 utilized with a POSIX®-compliant file system.

11. A storage medium encoded with machine-readable code, the code including instructions for causing a computer to implement a method of garbage collection comprising:

providing ordinary pointers to point only to local objects, said local objects are objects that must expire before invocations that create them;

providing owning and non-owning pointers to point only to managed objects, said managed objects are objects that may outlive invocations that create them;

determining whether said managed objects are reachable from at least one of said owning pointers;

destroying or marking for destruction at least one of said managed objects when said at least one of said managed objects is un-reachable through said at least one of said owning pointers or said at least ore of said non-owning pointers; and nullifying said non-owning pointers pointing to said at least one of said managed objects when said at least one of said managed objects is destroyed or marked for destruction.

12. The storage medium of claim 11 wherein said determining whether said managed objects are reachable from said at least one of said owning pointers comprises:

determining whether said managed objects are reachable from said at least one of said owning pointers through said at least one of said owning pointers or at least one of said non-owning pointers.

13. The storage medium of claim 11 wherein the method further comprises:

defining classes of said owning and non-owning pointers.

14. The storage medium of claim 13 wherein the method further comprises:

restricting use of said classes according to rules of a programming language.

15. The storage medium of claim 11 wherein any one of said invocations comprises a subroutine invocation.

16. The storage medium of claim 11 wherein the method further comprises:

sharing said managed objects with multiple threads of control within a single process; and accessing a shared memory allocation pool serialized by a lock accessible by said threads, said managed objects that are shared are allocated to said shared memory allocation pool, said lock controlling access to said managed objects that are shared.

17. The storage medium of claim 16 wherein the method further comprises:

defining classes of said owning and non-owning pointers; and restricting use of said classes according to rules of a programming language.

18. The storage medium of claim 11 wherein the method further comprises:

sharing said managed objects with multiple processes within a single system; and accessing a shared memory allocation pool serialized by a lock accessible by said processes, said managed objects that are shared are allocated to said shared memory allocation pool, said lock controlling access to said managed objects that are shared.

19. The storage medium of claim 18 wherein the method further comprises:

defining classes of said owning and non-owning pointers; and restricting use of said classes according to rules of a programming language.

[20. A signal propagated over a propagation medium, the signal encoded with code, the code including instructions for causing a computer to implement a method of garbage collection comprising:

providing ordinary pointers to point only to local objects, said local objects are objects that must expire before invocations that create them;

providing owning and non-owning pointers to point only to managed objects, said managed objects are objects that may outlive invocations that create them;

determining whether said managed objects are reachable from at least one of said owning pointers;

destroying or marking for destruction at least one of said managed objects when said at least one of said managed objects is un-reachable through said at least one of said owning pointers or said at least one of said non-owning pointers; and nullifying said non-owning pointers pointing to said at least one of said managed objects when said at least one of said managed objects is destroyed or marked for destruction.]

[21. The signal propagated over the propagation medium of claim 20 wherein said determining whether said managed objects are reachable from said at least one of said owning pointers comprises:

determining whether said managed objects are reachable from said at least one of said owning pointers through said at least one of said owning pointers or at least one of said non-owning pointers.]

[22. The signal propagated over the propagation medium of claim 20 wherein the method further comprises:

defining classes of said owning and non-owning pointers.]

[23. The signal propagated over the propagation medium of claim 22 wherein the method further comprises:

restricting use of said classes according to rules of a programming language.]

[24. The signal propagated over the propagation medium of claim 20 wherein any one of said invocations comprises a subroutine invocation.]

[25. The signal propagated over the propagation medium of claim 20 wherein the method further comprises:

sharing said managed objects with multiple threads of control within a single process; and accessing a shared memory allocation pool serialized by a lock accessible by said threads, said managed objects that are shared are allocated to said shared memory allocation pool, said lock controlling access to said managed objects that are shared.]

[26. The signal propagated over the propagation medium of claim 25 wherein the method further comprises:

defining classes of said owning and non-owning pointers; and restricting use of said classes according to rules of a programming language.]

[27. The signal propagated over the propagation medium of claim 20 wherein the method farther comprises:

sharing said managed objects with multiple processes within a single system; and accessing a shared memory allocation pool serialized by a lock accessible by said processes, said managed objects that are shared are allocated to said shared memory allocation pool, said lock controlling access to said managed objects that are shared.]

[28. The signal propagated over the propagation medium of claim 27 wherein the method further comprises:

defining classes of said owning and non-owning pointers; and restricting use of said classes according to rules of a programming language.]

*29. A method of garbage collection in computer memory, the method comprising:*

*pointing by a processor one or more owning pointers or non-owning pointers, or a combination thereof, to one or more managed objects, the managed objects being created in the computer memory during a first invocation, and capable of outliving one or more subsequent invocations;*

*determining by the processor, whether at least one or more of the managed objects is reachable from at least one of the owning pointers; and*

*marking by the processor, for destruction at least one of the managed objects if one or more of the managed objects is unreachable through at least one or more of the owning pointers or the non-owning pointers.*

*30. The method as claimed in claim 29, further comprising pointing by the processor, one or more ordinary pointers to one or more local objects, the local objects configured to be able to expire before invocations that created the local objects expire.*

*31. The method as claimed in claim 29, further comprising:*

*nullifying by the processor, one or more of the non-owning pointers pointing to one or more of the unreachable managed objects if one or more of the unreachable managed objects is destroyed or marked for destruction, or a combination thereof.*

*32. The method as claimed in claim 29, further comprising:*

*destroying by the processor, at least one of the managed objects if one or more of the managed objects is unreachable through at least one or more of the owning pointers or the non-owning pointers.*

*33. The method as claimed in claim 29, wherein determining comprises determining whether the managed objects are reachable from at least one of the owning pointers through at least one of the owning pointers or at least one of the non-owning pointers.*

*34. The method as claimed in claim 29, further comprising:*

*defining by the processor, classes of the owning pointers or the non-owning pointers, or a combination thereof.*

*35. The method as claimed in claim 29, further comprising:*

*defining by the processor, classes of the owning pointers or the non-owning pointers, or a combination thereof; and*

*restricting by the processor, at least in part, one or more uses of the classes according to one or more rules of a programming language.*

*36. The method as claimed in claim 29, wherein one or more of the invocations comprises a subroutine invocation.*

*37. The method as claimed in claim 29, further comprising:*

*sharing by the processor, the managed objects with one or more threads of control within a single process; and*

*accessing by the processor, a shared memory allocation pool serialized by a lock, the lock being accessible by the one or more threads, managed objects that are shared being allocable to the shared memory allocation pool, wherein the lock is configured to control access to one or more of the managed objects that are shared.*

*38. The method as claimed in claim 29, further comprising:*

*sharing by the processor, the managed objects with one or more threads of control within a single process;*

*accessing by the processor, a shared memory allocation pool serialized by a lock, the lock being accessible by the one or more threads, managed objects that are shared being allocable to the shared memory allocation pool, wherein the lock is configured to control access to one or more of the managed objects that are shared;*

*defining by the processor, one or more classes of the owning pointer or the non-owning pointers, or a combination thereof; and*

*restricting by the processor, at least in part, one or more uses of the classes according to one or more rules of a programming language.*

*39. The method as claimed in claim 29, further comprising:*

*sharing by the processor, said managed objects with one or more processes within a single system; and*

*accessing by the processor, a shared memory allocation pool serialized by a lock, the lock being accessible by one or more of the processes, managed objects that are shared being allocable to the shared memory allocation pool, wherein the lock is configured to control access to one or more of the managed objects that are shared.*

*40. The method as claimed in claim 29, further comprising:*

*sharing by the processor, said managed objects with one or more processes within a single system;*

*accessing by the processor, a shared memory allocation pool serialized by a lock, the lock being accessible by one or more of the processes, managed objects that are shared being allocable to the shared memory allocation pool, wherein the lock is configured to control access to one or more of the managed objects that are shared;*

*defining by the processor, one or more classes of the owning pointers or the non-owning pointers, or a combination thereof; and*

*restricting by the processor, at least in part, one or more uses of the classes according to one or more rules of a programming language.*

*41. The method of claim 29, wherein the pointing, determining and marking are performed in conjunction with a POSIX®-compliant type file system.*

*42. A computer memory management system, comprising:*

*means for storing one or more managed objects; and*

*means for maintaining one or more owning pointers or one or more non-owning pointers, or a combination thereof, being capable of pointing to one or more of the managed objects;*

*wherein one or more of the owning pointers or one or more of the non-owning pointers, or a combination thereof, is configured to point to one or more of the managed objects;*

*said one or more managed objects are configured to be able to be destroyed if one or more of the managed objects is unreachable through one or more of the owning pointers or the non-owning pointers;*

*wherein the managed objects are capable of outliving one or more invocations that created the managed objects.*

*43. The computer memory management system as claimed in claim 42, further comprising:*

*means for maintaining one or more ordinary pointers configured to point to one or more local objects, wherein the local objects are configured to be able to expire before invocations that created the local objects expire.*

*44. The computer memory management system as claimed in claim 42, wherein one or more of the owning pointers or the non-owning pointers, or a combination thereof, are configured to be able to be nullified if one or more of the unreachable managed objects is destroyed or marked for destruction, or a combination thereof.*

*45. The computer memory management system as claimed in claim 42, further comprising means for one or more invocations configured to access one or more of the managed objects.*

*46. The computer memory management system as claimed in claim 42, further comprising one or more subroutines configured to access one or more of the managed objects.*

*47. The computer memory management system as claimed in claim 42, further comprising a shared memory allocation pool serialized by a lock, wherein the lock is configured to be accessed by one or more threads of control within a process, wherein one or more of the managed objects are allocable to the shared memory allocation pool, and wherein the lock is configured to control access to one or more of the managed objects that are shared.*

*48. The computer memory management system as claimed in claim 42, further comprising means for accessing a shared memory allocation pool serialized by a lock, wherein the lock is configured to be accessible by one or more processes, wherein one or more of the managed objects are allocable to the shared memory allocation pool, and the lock is configured to control access to one or more of the managed objects that are shared.*

*49. The computer memory management system as claimed in claim 42, further comprising a POSIX®-compliant type file system configure to utilize one or more of the managed objects.*

* * * * *

UNITED STATES PATENT AND TRADEMARK OFFICE

CERTIFICATE OF CORRECTION

PATENT NO. : RE42,396 E
APPLICATION NO. : 11/286439
DATED : May 24, 2011
INVENTOR(S) : Hills It is certified that error appears in the above-identified patent and that said Letters Patent is hereby corrected as shown below:

Title page, item (75), under "Inventor", in Column 1, Line 1, delete "Lambertvile," and insert -- Lambertville, --.

Column 12, lines 47–48, in Claim 4, delete "programing" and insert -- programming --.

Column 13, line 29, in Claim 11, delete "ore" and insert -- one --.

Signed and Sealed this
Eleventh Day of October, 2011

David J. Kappos

David J. Kappos
*Director of the United States Patent and Trademark Office*